United States Patent [19]
McCauley

[11] 3,952,716
[45] Apr. 27, 1976

[54] FUEL CONSERVATION MEANS FOR INTERNAL COMBUSTION ENGINES AND THE LIKE

[75] Inventor: Roger A. McCauley, Tulsa, Okla.

[73] Assignee: Rexar Industries, Inc., Tulsa, Okla.

[22] Filed: June 24, 1974

[21] Appl. No.: 482,269

[52] U.S. Cl. .............................. 123/141; 123/119 E
[51] Int. Cl.² ........................................ F02M 29/00
[58] Field of Search ...................... 123/141, 119 E; 48/180 R, 180 M

[56] References Cited
UNITED STATES PATENTS

| | | | |
|---|---|---|---|
| 2,251,999 | 8/1941 | Greco | 123/141 |
| 2,576,450 | 11/1951 | De Marval | 123/119 E X |
| 2,639,230 | 5/1953 | Lefebre | 123/141 X |
| 2,659,667 | 11/1953 | Bosdet | 123/141 X |
| 2,669,508 | 2/1954 | Christensen | 123/141 X |
| 2,705,941 | 4/1955 | Unschuld | 123/119 E |
| 2,745,372 | 5/1956 | Chertoff | 123/119 E X |
| 3,164,451 | 1/1965 | Almquist | 123/141 X |
| 3,467,072 | 9/1969 | Toesca | 123/141 |
| 3,544,290 | 12/1970 | Larson et al. | 123/141 |

Primary Examiner—Charles J. Myhre
Assistant Examiner—Ira S. Lazarus
Attorney, Agent, or Firm—Head & Johnson

[57] ABSTRACT

A device adapted to be interposed between the usual carburetor and manifold of an internal combustion engine, or the like, for receiving the fuel-air mixture from the carburetor and discharging same into the manifold, said device comprising three components or stages: a rotor member, a sonic vibrator, and a heated grid means. The rotor member is mounted in the flow stream of the fuel-air mixture and is rotated by the air intake for causing oscillation of the fuel-air mixture from the carburetor. The fuel-air mixture then enters the sonic vibration stage which causes a molecular mixing of the fuel with the air. The mixed fuel-air is then passed through the heated grid or screen, which not only straightens out the path of the flow stream of the fuel-air mixture, but also promotes vaporization of the fuel-air mixture impinging the screen, and receiving the heat by radiation. A magnetic force field is established in the area of the screen or grid which magnetically affects the molecular structure of the hydrocarbon content of the fuel-air mixture to provide a more efficient power conversion of the fuel-air mixture.

12 Claims, 6 Drawing Figures

/page number 3,952,716/

FUEL CONSERVATION MEANS FOR INTERNAL COMBUSTION ENGINES AND THE LIKE

BACKGROUND OF THE INVENTION

1. Field of the Invention

This invention relates to improvements in fuel conservation means and more particularly, but not by way of limitation, to a device adapted to be interposed between a carburetor and manifold of an internal combustion engine, or the like, for increasing the conservation of the fuel.

2. Description of the Prior Art

In the usual internal combustion engine, or the like, the fuel-air mixture normally moves through the carburetor directly into the manifold and to the combustion chamber for burning. The fuel and air are normally admitted into the carburetor and directed simultaneously into the manifold, with certain air to fuel ratios being considered optimum for achieving an efficient burning of the fuel-air mixture. For example, fourteen parts air to one part fuel is considered to be an optimum air to fuel ratio. However, with the normal present day carburetor mechanism the air and fuel are usually not sufficiently mixed prior to discharge into the combustion chamber, thus resulting in an inefficient burning of the fuel. This causes waste of the fuel and usually causes the discharge of pollutants into the atmosphere through the engine exhaust system. With the current and ever increasing concern with the shortage of fuels, and dangers of air pollution, it is becoming urgent to reduce fuel waste and reduce the exhaust of pollutants into the atmosphere.

SUMMARY OF THE INVENTION

The present invention contemplates a device which is particularly designed and constructed for conserving fuel during the operation of an internal combustion engine, or the like. The novel device is adapted to be interposed between the discharge or outlet side of a carburetor and the inlet or intake side of a manifold for receiving the fuel-air flow stream therethrough. The fuel-air mixture from the carburetor initially comes into contact with a rotor means and the force of the flow stream causes the rotor to rotate for stirring the flow stream and agitating the fuel-air mixture. Sonic reed or fin means is operably connected with the rotor means for simultaneous rotation therewith, and as the flow stream passes around or through the area of the sonic blade or reed, sonic vibrations are impressed on the flow stream for acting thereon. The flow stream is then directed through a heated screen or grid means, around which a magnetic force field is established. The grid means serves to straighten out the flow path of the flow stream, and the magnetic force field affects the molecular structure of the fuel and air mixture, particularly the hydrocarbon components thereof, which apparently promotes a more efficient power conversion of the fuel and air mixture. Of course, it is preferable that the heating of the screen or grid means be of a low order to avoid any accidental flashing of the fuel-air mixture passing therethrough. In addition, it is preferable that the screen or grid means comprises a pair of substantially identical grid elements spaced apart and rotationally orientated with respect to each other for providing a grid pattern for passage of the flow stream therethrough with a minimum of air restriction, or to prevent any excessive air restriction.

DESCRIPTION OF THE PREFERRED EMBODIMENTS

Figures 1, 4:
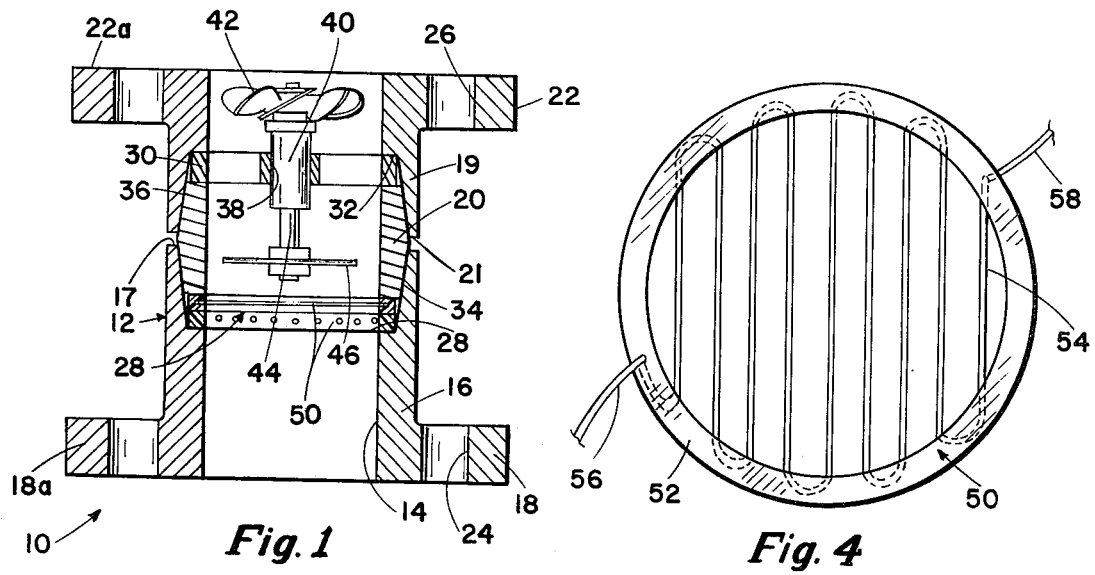
FIG. 1 is a sectional elevational view of a fuel conservation device embodying the invention.
FIG. 4 is an enlarged plan view of a grid element such as may be utilized in the invention.

Referring to the drawings in detail, reference character 10 generally indicates a fuel conservation device for use with internal combustion engines (not shown) or the like, and comprises an outer housing 12 having a central passageway 14 extending longitudinally therethrough. Whereas the housing 12 may be of substantially any desired construction, as shown herein the housing 12 is sectional and comprises a first sleeve member 16 having one open end 17 and outwardly extending oppositely disposed flanges 18 and 18a provided at the opposite end thereof. A second sleeve 19 is secured in substantial axial alignment with the sleeve 16 by a collar 20 and is provided with one open end 21 disposed in the proximity of the open end 17 and oppositely disposed outwardly extending flanges 22 and 22a at the opposite end thereof. The flanges 18—18a and 22—22a are provided with bores 24 and 26, respectively, with the bores 24 of the flanges 18—18a being substantially axially aligned with the bores 26 of the flanges 22—22a for a purpose as will be hereinafter set forth.

An annular shoulder 28 is provided on the inner periphery of the sleeve 16 spaced from the open end 17 thereof for receiving a grid means 28 thereon. The grid means 28 is secured in position on the shoulder 28 by the collar 20 in a manner as will be hereinafter set forth. A spider member or apertured disc 30 is disposed against the uppermost end of the collar 20 as viewed in FIG. 1, and an annular shoulder 32 provided on the inner periphery of the sleeve 19 rests on the ring or disc 30 for retaining the ring in position against the collar 19.

Whereas the collar 20 may be of substantially any well known construction for securing the sleeves 16 and 19 in end to end relationship, as shown herein substantially one-half the outer periphery of the collar 20 is tapered radially outwardly in a direction toward the longitudinal center thereof as shown at 34, and the remaining portion of the outer periphery of the collar 20 is tapered radially inwardly toward the end thereof as shown at 36 in FIG. 1. The inner periphery of the sleeve 16 between the shoulder 28 and the open end 17 thereof is preferably of a tapered configuration complementary to the tapered portion 34 of the collar 20 for snugly receiving the collar 20 thereagainst. In addition, the inner periphery of the sleeve 19 between the shoulder 30 and the open end 21 thereof is preferably of a tapered configuration complementary to the tapered portion 36 of the collar 20 for snugly receiving the collar 20 thereagainst. Of course, suitable bolts (not shown) may be inserted through the mutually aligned pairs of bores 24 and 26 for securing the sleeves 16 and 19 together and clamping the ring 30, collar 20 and grid means 28 therein.

The spider or perforated plate 30 is provided with a central bore 38 for receiving a hub 40 therethrough. A rotor member or propeller 42 is suitably journalled in the hub 40 in any well known manner (not shown) and is provided with a shaft 44 which extends through and beyond the hub 40. A blade or reed 46 is secured to the outer end of the shaft 44 in any suitable manner for rotation simultaneously with the rotor 42. The reed or blade 46 is preferably constructed from a suitable spring steel, preferably approximately five thousandths of an inch in thickness, but not limited thereto, and the plane of the reed 46 is preferably substantially perpendicular to the longitudinal axis of the shaft 44 whereby the reed 46 is rotated in the plane of its own surface during rotation of the rotor 42. In addition, a plurality of spaced apertures 48 (FIG. 3) are provided in the reed 46, said apertures preferably being of a diametric size corresponding to the usual number "80" drill bit, but not limited thereto. Of course, the reed 46 is installed or disposed downstream of the rotor 42, as clearly shown in FIG. 1, and it is to be understood that the sonic reed 46 may be stationary, or retained against rotation, if desired.

The grid means 28 preferably comprises a pair of substantially identical grid-type discs 50 preferably spaced slightly apart by suitable spacer means (not shown) in order to preclude excessive restriction to the flow stream moving therethrough. Each disc 50 comprises an annular outer ring 52 (FIG. 4) having a single strand of Ni-chrome wire 54 or the like of a suitable diametric size and following a back-and-forth pathway across the open central portion of the rints 52, with the loops or segments of the wire 54 at the turning points thereof being molded or otherwise secured to the ring 52. In addition, the portions of the wire 54 spanning the open central portion of the ring 52 are preferably substantially mutually parallel. The opposite ends of the wire 54 extend beyond the outer periphery of the rings 52 as clearly shown in FIG. 4, with one end 56 emerging from one surface of the ring 52 and the opposite end 58 emerging from the opposite surface thereof. In the assembly of the grid means 28, one of the discs 50 is disposed in axial alignment with the other of the discs 50, but with a rotational orientation between the discs 50 such that the wires 54 of one disc are substantially perpendicularly disposed with respect to the wires 54 of the other disc. The ends of the wire 54 which emerge from the common sides or surfaces thereof, or the surfaces facing one another, are connected in any well known manner, and the connected ends and free ends are suitably connected with an electrical source (not shown), such as the electrical system of an automobile wherein the internal combustion engine (not shown) with which the device 10 is to be utilized is installed. Of course, it will be apparent that the opposite ends 56 and 58 of the connected discs 50 may be connected with the electrical source, and the common wires which are connected between the discs 50 will electrically connect the discs 50 in the circuit.

It is to be understood that the grid 28 may be of an ultimate substantially unitary construction in that the rings 52 of the complementary discs 50 may be cemented or otherwise secured together subsequent to the forming of the wires 54 therein whereby in essence the outer rings 52 form a single annular ring (not shown) having a pair of mutually perpendicularly arranged wire grid portions 54 in spaced relation in the central portion thereof.

Whereas the housing 12 as shown herein is of a sectional construction, it is to be noted that the outer housing 12 may be of a unitary construction, having a central bore or passageway extending longitudinally therethrough wherein the rotor 42, sonic reed 46 and grid means 28 may be suitably installed.

Figure 2:
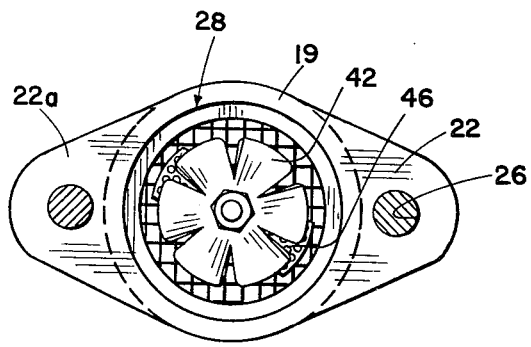
FIG. 2 is a view taken on line 2—2 of FIG. 1.
Figure 3:
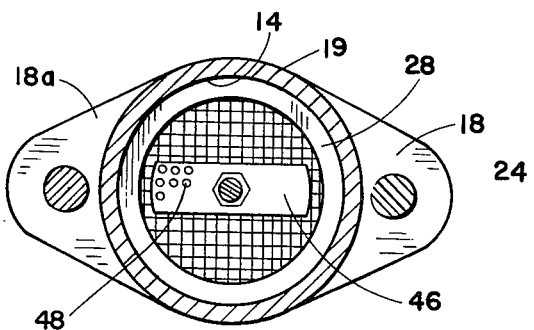
FIG. 3 is a view taken on line 3—3 of FIG. 1.

The device 10 as shown in FIGS 1, 2 and 3 is particularly designed and constructed for use in combination with a single barrel carburetor (not shown) and may be installed between the discharge side of the carburetor and the intake side of the associated manifold (not shown). The device 10 is installed in such a way that the rotor or propeller 42 is upstream from the grid means 28 with regard to the flow of the fuel-air mixture from the carburetor to the manifold. The carburetor and manifold function in the normal manner therefor, and as the fuel-air mixture is pulled into the manifold from the carburetor, the flow stream moves across the rotor 42, transmitting rotation thereto. The rotation of the rotor 42 stirs the flow stream for an agitation thereof, and as the flow stream continues to move across the sonic reed 46, sonic vibrations are impressed on the flow stream. The reed 46 may be either electrically or mechanically induced for impressing the sonic vibrations on the flow stream.

The flow stream then moves across the grid means 28 wherein the path of travel of the stream is straightened and the fuel-air mixture is heated. The portion of the flow stream striking the heated wires 54 is substantially vaporized, and the remaining portion of the flow stream is heated by radiation. Also the flow stream is acted upon by the magnetic force field surrounding the wires 54. This force field apparently acts on the molecular structure of the fuel-air mixture, particularly the hydrocarbon components thereof, which results in a more efficient power conservation of the fuel-air mixture than otherwise possible.

Under test conditions the increased efficiency of fuel conservation with use of the device 10 has been found to be considerable. With Dynamometer testing the results showed an increase in mileage per gallon of approximately 53.59 per cent, and an increase of two in the engine horse power. In actual road testing, the mileage per gallon was increased by 45.08 per cent. The advantages of such an increased efficiency are apparent.

Figure 5:
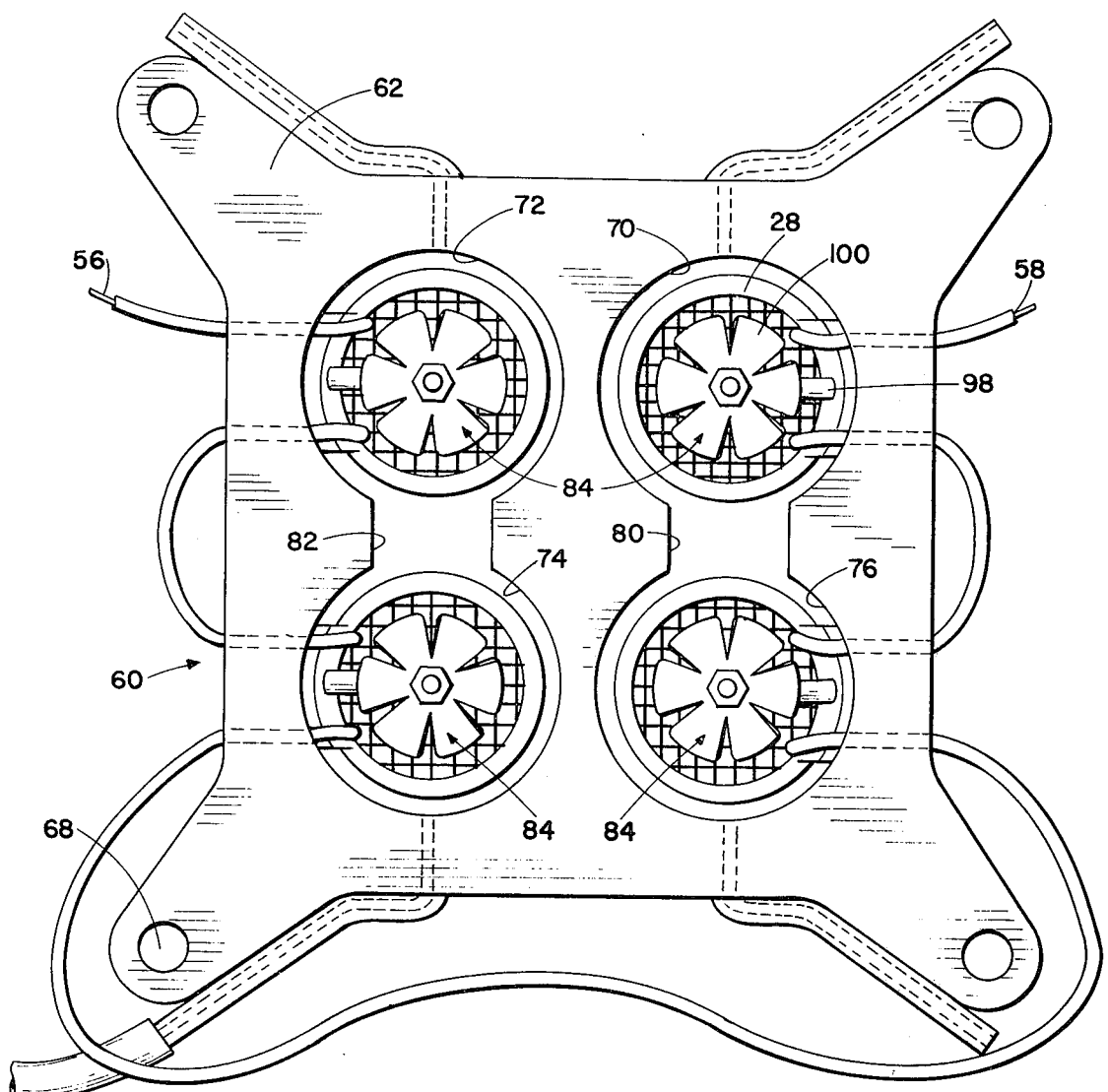
FIG. 5 is a plan view of a modified fuel conservation device embodying the invention.
Figure 6:
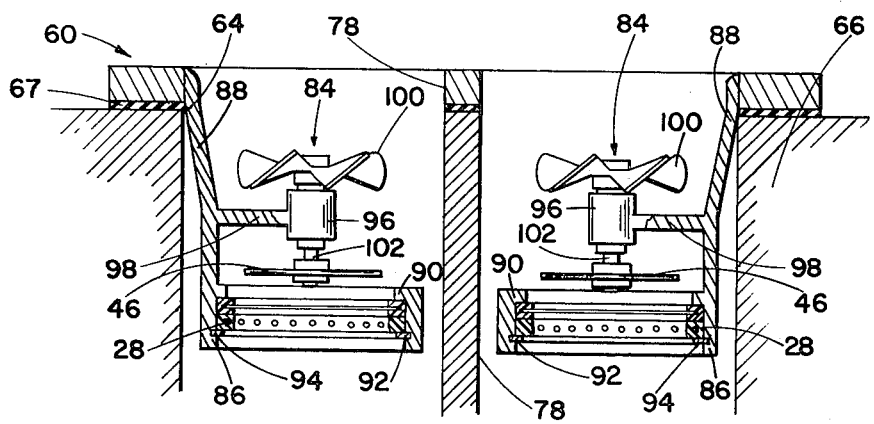
FIG. 6 is a sectional elevational view of the embodiment depicted in FIG. 5 and illustrated as installed in a manifold.

Referring now to FIGS. 5 and 6, a modified fuel conservation device 60 is shown which has been particularly designed and constructed for use in combination with a four barrel carburetor (not shown). The device 60 comprises a plate 62 adapted for disposition over the intake opening 64 of a suitable manifold 66 and having a plurality of apertures 68 for alignment with similar apertures or bores (not shown) provided in the manifold 66 wherein the plate 62 may be secured to the manifold 66 by suitable bolts, or the like (not shown). Of course, it is preferable to interpose a suitable gasket 67 between the plate 62 and the manifold 66. Spaced bores 70, 72, 74 and 76 are provided in the plate 62 in substantial alignment with the usual bores 78 of the manifold 66. It is preferable to provide an opening 80 between the bores 70 and 76, and a similar opening 82 between the bores 72 and 74, but not limited thereto. A fuel-air mixture handling element 84 is suspended within each manifold bore 78 from the plate 62 and since the elements 84 are substantially identical, only one will be set forth in detail herein.

The element 84 comprises an annular support ring 86 suspended from the plate 62 by an arm 88. The arm 88 may be integral with the plate 62, or may be secured thereto in any suitable manner, as desired. In inwardly directed annular shoulder 90 is provided on the inner periphery of the ring 86 for receiving the grid means 28 thereagainst, and an annular groove 92 is provided in the inner periphery of the ring 86 spaced from the shoulder 90 for receiving a suitable snap ring or lock washer 94 therein for retaining the grid means 28 securely in position against the shoulder 90. A hub member 96 is spaced from the ring 86 and supported in substantial axial alignment therewith by an arm 98 which is secured to or integral with the arm 88. A rotor 100 of any suitable type is journalled in the hub 96 in any well known manner for free rotation about its longitudinal axis, and is provided with a shaft 102 which extends through and beyond the hub 96 as particularly shown in FIG. 6. The sonic reed or blade 46 is secured to the outer extremity of the shaft 102 in any suitable manner for rotation simultaneously therewith.

The fuel-air mixture is pulled into the manifold 66 from the carburetor (not shown) in the usual manner, and the rotors 100 of the elements 84 are disposed directly in the flow stream of the fuel-air mixture entering the manifold. The moving flow stream transmits rotation to the rotors 100, which stir the flow stream for an agitation thereof. The flow stream then enters the area surrounding the sonic reeds 46 which impress a sonic frequency on the flow stream. The fuel-air mixture then passes through the grids 28 which heat the flow stream and magnetically affect the molecular structure of the fuel-air mixture while straightening out the flow path of the fuel-air mixture. The heated grid means 28 also substantially vaporizes the fuel-air mixture. The fuel-air mixture thus treated produces a greatly increased conservation efficiency as well as increased engine operating efficiency.

It will be readily apparent that the invention may be utilized with substantially any type carburetor and manifold combination, from single barrel carburetors to multipe barrel carburetors, with great fuel conservation during operation of the associated engine, or the like.

From the foregoing it will be apparent that the present invention provides a novel fuel conservation device comprising three essential and basic stages: a rotor stage wherein the fuel-air mixture flow stream is stirred for an agitation thereof, a sonic frequency stage wherein sonic frequency is impressed on the flow stream, and a heated grid stage wherein the flow stream is heated for a substantial vaporization thereof and magnetically affected as well as a straightening of the flow path of the fuel-air mixture leaving the manifold. The novel device is simple and efficient in operation and economical and durable in construction.

Whereas the present invention has been described in particular relation to the drawings attached hereto, it should be understood that other and further modifications, apart from those shown or suggested herein, may be made within the spirit and scope of this invention.

What is claimed is:

1. A fuel conservation device adapted to be interposed in a flow stream for receiving a fuel-air mixture therethrough and comprising rotor means initially intercepting the fuel-air mixture and being rotated thereby, sonic reed means disposed downstream of the rotor means for impressing sonic vibrations on said fuel-air mixture to facilitate mixing of the fuel and air components thereof, and heated grid means disposed downstream of the sonic reed means for substantial vaporization of the fuel-air mixture.

2. A fuel conservation device as set forth in claim 1 wherein the rotor means comprises a propeller member journalled in a hub member and having a shaft extending through and beyond said hub member and rotatable with said propeller member, and said sonic reed means is secured to said shaft for rotation simultaneously with the propeller member.

3. A fuel conservation device as set forth in claim 1 wherein the grid means comprises a pair of substantially identical grid discs, each of said grid discs having a plurality of mutually parallel wires secured thereacross, said discs being disposed in spaced longitudinal alignment and rotationally orientated whereby the wires of one of said discs are substantially perpendicular with respect to the wires of the other of said discs.

4. A fuel conservation device as set forth in claim 3 wherein each of said discs comprises an annular ring member, a continuous wire woven in a back-and-forth path to provide said mutually parallel arrangement, the connecting loop portions at each turn around point of the wire being secured to the annular ring member, one end of said wire emerging from one surface of the annular ring member, and the other end of the wire emerging from the oppositely disposed surface of the annular ring member.

5. A fuel conservation device as set forth in claim 4 wherein the wire ends emerging from the facing surface of the two discs are connected together.

6. A fuel conservation device comprising housing means adapted to be interposed between a carburetor and manifold for receiving a fuel-air mixture flow stream therethrough, rotor means journalled within the housing and disposed in the flow stream for rotation thereby to agitate the flow stream for facilitating mixing of the fuel and air components thereof, sonic reed means disposed downstream of the rotor means and operably connected thereto for rotation simultaneously therewith to impress sonic vibrations on the agitated fuel-air mixture flow stream, heated grid means disposed in the housing means downstream of the sonic reed means for heating the flow stream for vaporization thereof.

7. A fuel conservation device as set forth in claim 6 wherein the rotor means includes a propeller journalled on a hub and having a shaft extending through and beyond the hub, said sonic reed means being secured to the shaft for rotation simultaneously with the propeller.

8. A fuel conservation device as set forth in claim 6 wherein the sonic reed means comprises a substantially flat reed member having the plane thereof disposed substantially perpendicular to the longitudinal axis of the shaft, said reed member being provided with a plurality of spaced apertures.

9. A fuel conservation device as set forth in claim 8 wherein the reed member is constructed from spring steel.

10. A fuel conservation device as set forth in claim 9 wherein the spring steel is approximately five thousandths of an inch in thickness, and the apertures are of a diametric size substantially equal to the size of a number 80 drill bit.

11. A fuel conservation device as set forth in claim 6 wherein the grid means comprises a pair of longitudinally spaced substantially identical grid discs, each of said grid discs comprising a plurality of mutually parallel wires extending thereacross, said grid discs being rotationally orientated with respect to each other whereby the mutually parallel wires of one grid disc are substantially perpendicular to the mutually parallel wires of the other grid disc, means connecting the wires of one disc with the wires of the other disc, and means for electrically connecting the discs with a source of electrical current for heating of the grid means.

12. A fuel conservation device as set forth in claim 6 wherein the rotor means includes a plurality of propeller members journalled in independent hub members, and including a sonic reed means and grid means for each of said propeller members.

* * * * *

UNITED STATES PATENT OFFICE
CERTIFICATE OF CORRECTION

Patent No. 3,952,716   Dated April 27, 1976

Inventor(s)  Roger A. McCauley

It is certified that error appears in the above-identified patent and that said Letters Patent are hereby corrected as shown below:

Claim 1, last line, change the period to a comma and add -- and magnetically affecting the molecular structure thereof. --.

Claim 6, line 13, after "heating" add -- and magnetically affecting --; last line, change the period to a comma, and add -- and changing of the molecular structure thereof to increase the efficiency of the conservation of the fuel. --.

Signed and Sealed this

Twenty-fifth Day of January 1977

[SEAL]

Attest:

RUTH C. MASON
*Attesting Officer*

C. MARSHALL DANN
*Commissioner of Patents and Trademarks*

UNITED STATES PATENT OFFICE
CERTIFICATE OF CORRECTION

Patent No. 3,952,716          Dated April 27, 1976

Inventor(s) Roger A. McCauley

It is certified that error appears in the above-identified patent and that said Letters Patent are hereby corrected as shown below:

Claim 1, last line, change the comma to a period and "and magnetically affecting the molecular structure thereof" should be deleted.

Claim 6, line 13, after "heating", "and magnetically affecting" should be deleted; last line change the comma to a period, and "and changing of the molecular structure thereof to increase the efficiency of the conservation of the fuel" should be deleted.

This certificate supersedes Certificate of Correction issued January 25, 1977.

Signed and Sealed this

Twenty-sixth Day of April 1977

[SEAL]

Attest:

RUTH C. MASON
Attesting Officer

C. MARSHALL DANN
Commissioner of Patents and Trademarks